(12) United States Patent
Tene et al.

(10) Patent No.: US 10,263,932 B2
(45) Date of Patent: Apr. 16, 2019

(54) COMMENT MANAGEMENT IN SHARED DOCUMENTS

(71) Applicant: Dropbox, Inc., San Francisco, CA (US)

(72) Inventors: Ran Tene, Tel Aviv (IL); Elad Shahar, Tel Aviv (IL)

(73) Assignee: Dropbox, Inc., San Francisco, CA (US)

(*) Notice: Subject to any disclaimer, the term of this patent is extended or adjusted under 35 U.S.C. 154(b) by 324 days.

(21) Appl. No.: 15/394,613

(22) Filed: Dec. 29, 2016

(65) Prior Publication Data

US 2018/0191659 A1 Jul. 5, 2018

(51) Int. Cl.
G06F 15/16 (2006.01)
H04L 12/58 (2006.01)

(52) U.S. Cl.
CPC ............ *H04L 51/16* (2013.01); *H04L 51/046* (2013.01); *H04L 51/28* (2013.01); *H04L 51/32* (2013.01)

(58) Field of Classification Search
CPC ....... H04L 51/16; H04L 51/046; H04L 51/28; H04L 51/32
USPC ........................................ 709/204, 205, 223
See application file for complete search history.

(56) References Cited

U.S. PATENT DOCUMENTS

| | | | |
|---|---|---|---|
| 8,195,665 B1 * | 6/2012 | Mayle | G06F 17/30849 707/737 |
| 8,332,747 B2 * | 12/2012 | Carro | G06F 9/543 715/243 |
| 8,996,985 B1 * | 3/2015 | Johnston | G06F 17/241 715/230 |
| 9,449,182 B1 * | 9/2016 | Dang | G06F 17/30011 |
| 9,753,921 B1 * | 9/2017 | DeVincenzi | G06F 17/30011 |
| 2006/0026516 A1 * | 2/2006 | LeGrys | G06F 17/24 715/248 |
| 2010/0031190 A1 * | 2/2010 | Hall | G06F 17/30991 715/806 |

(Continued)

OTHER PUBLICATIONS

Howard, C.D. et al., "Anonymity to Promote Peer Feedback: Pre-Service Teachers' Comments in Asynchronous Computer-Mediated Communication," Journal of Educational Computing Research, Jan. 2010, pp. 89-112, vol. 43, No. 1 [Online] [Retrieved on May 9, 2018] Retrieved from the Internet<URL:https://www.researchgate.net/profile/Craig_Howard/publication/250145013_Anonymity_to_Promote_Peer_Feedback_Pre-Service_Teachers'_Comments_in_Asynchronous_Computer-Mediated_Communication/links/0046352e97b40f13dc000000.pdf>.

*Primary Examiner* — Philip B Tran
(74) *Attorney, Agent, or Firm* — Fenwick & West LLP

(57) ABSTRACT

Anonymous comments and comment rooms can improve privacy and facilitate user activity in a collaboration content item system. Some embodiments include a method for anonymous comments that can include receiving a request to add an anonymous comment to a collaboration content item. The method can further include generating an anonymous user identifier for a user associated with the request. The method can further include inserting the anonymous comment in the collaboration content item with a representation of the anonymous user. The representation can include an anonymous avatar generated based on the anonymous user identifier. Some embodiments may include comment rooms for collaboration content items. Multiple users are associated with a comment room. Comments, annotations, or content updates to a collaboration content item performed within a comment room are visible only to the users associated with the comment room.

20 Claims, 12 Drawing Sheets

(56) References Cited

U.S. PATENT DOCUMENTS

| | | | |
|---|---|---|---|
| 2012/0060105 A1* | 3/2012 | Brown | H04L 51/24 |
| | | | 715/753 |
| 2012/0166793 A1* | 6/2012 | Kim | H04L 9/0825 |
| | | | 713/150 |
| 2012/0226996 A1* | 9/2012 | Park | G06F 17/241 |
| | | | 715/748 |
| 2013/0268850 A1* | 10/2013 | Kyprianou | G06F 17/24 |
| | | | 715/255 |
| 2014/0033294 A1* | 1/2014 | Swineford | H04L 63/0281 |
| | | | 726/12 |
| 2014/0223333 A1* | 8/2014 | Pegg | H04L 29/08684 |
| | | | 715/753 |
| 2015/0304268 A1* | 10/2015 | Byttow | H04L 51/32 |
| | | | 709/206 |
| 2016/0203500 A1* | 7/2016 | Williams | G06Q 30/0203 |
| | | | 705/7.32 |
| 2017/0041263 A1* | 2/2017 | Shekel | H04L 51/12 |
| 2017/0104805 A1* | 4/2017 | Plumley | H04L 65/604 |

* cited by examiner

900

905
Create a comment room for a collaboration content item by associating a document identifier with a room identifier

↓

910
Add users to the comment room by associating user identifiers with the room identifier

FIG. 9A

COMMENT MANAGEMENT IN SHARED DOCUMENTS

TECHNICAL FIELD

The disclosed embodiments generally relate to managing collaboration content items. In particular, the disclosed embodiments are directed to managing privacy of comments made by users on collaboration content items.

BACKGROUND

Collaborative sharing of documents is typically provided by a network-based file sharing computer system that allows multiple users to access and edit the files. Generally, documents are created and edited by a specific type of native application, such as a word processor or spreadsheet application. Many such applications provide support for tracking changes to the content made by individual users as well as comments or other forms of annotation. The annotations can include associating changes or comments with a user account of a user making the annotations, and providing an indication of the user account in relation to the changes when presenting the content. The indication of the user account can attribute the changes or comments to a user, which facilitates collaboration among users. However, attribution may result in users being more reluctant to provide comments, candid opinions, or honest feedback on the file sharing system. As files are shared with large crowds of networked users, users also risk losing control of their audience, and therefore also may feel reluctant to provide comments, candid opinions, or honest feedback on the file sharing system.

SUMMARY

A content management system allows users to create, access, edit, or share collaboration content items among a plurality of other users. Users can interact with the content management system using a client application on a client device. In various implementations, the client application can be an interface provided through a web browser, a stand-alone application, an overlay, plug-in, or extension to a third party application. In some embodiments, the interface allows users to access, edit, or share collaboration content items. The interface can receive various types of comments and comment management functionality, e.g. anonymous comments, comment rooms, or standard comments.

In some implementations, a collaboration content item can have standard comments that are attributed to a user who entered the comment. For example, a standard comment can be made in relation to all or a portion of a collaboration content item, can be associated with the comment's author, and can include content to show in the comment. Standard comments can be displayed in an interface for interacting with a collaboration content item, can be associated with an indication connecting a comment to a portion of the collaboration content item (e.g., a line connecting the comment to content in the collaboration content item, highlighting or underlining content in the collaboration content item, and/or numbering associating content in the collaboration content item with a comment, etc.), and can include a representation of the comment author (e.g., username, avatar, link to user details, special coloring or other formatting, etc.).

In some embodiments, a collaboration interface can provide functionality for users to post anonymous comments within a collaboration content item. An anonymous comment can have the features of a standard comment, but may not provide a representation of a particular comment author. In some implementations, all anonymous comments by a user or all anonymous comments by a user within a collaboration content item can be attributed to the same anonymous author, e.g., by virtue of an anonymous user identifier or anonymous avatar. This can facilitate dialogues between users while maintaining anonymity for the user. In some embodiments, the content management system generates an anonymous user identifier for the user based on the user identifier of the user. In some implementations, the anonymous user identifier can also be based on a document identifier of the collaboration content item. For example, a hash or other algorithmic transformation can be used to generate the anonymous user identifier based on the user identifier of the user and the document identifier of the collaboration content item. The content management system can also select an anonymous avatar for the anonymous user, such as based on an algorithmic transformation of the anonymous user identifier. The anonymous user identifier may be used as an anonymous username, or the anonymous username may be another string associated with the anonymous user identifier. Either or both the anonymous avatar or the anonymous username can serve as a representation of the commenting user for attribution purposes, and can be inserted within the collaboration content item with the anonymous comment. The user can selectively switch between anonymous comments or non-anonymous comments, such as by toggling a button provided within a user interface.

In some embodiments, the content management system provides collaboration content item comment rooms. Each comment room can be identified by a room identifier, which can be generated based on user input. The user can invite other users to the comment room, resulting in user identifiers of the invited users being associated with the room identifier. Users can post comments within the comment room to the collaboration content item associated with the comment room. Comments posted from within a comment room may be visible only to other users within the comment room. For example, each comment can be associated with a comment identifier that is associated with the room identifier of the comment room. When a user requests access to the collaboration content item via the comment room, each comment associated with the comment room is provided to the user within a user interface. In various implementations, these comments can include only the comments created from within the comment room or can also include standard comments made on the collaboration content item outside the comment room. Each comment room may further be associated with a separate version of the collaboration content item such that edits to the content performed within a comment room are visible only to the users associated with the content room.

The present invention has embodiments in a client device and client application, a content management system, computer program products, and computer implemented methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 9A shows a process for creating a comment room, in accordance with one embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
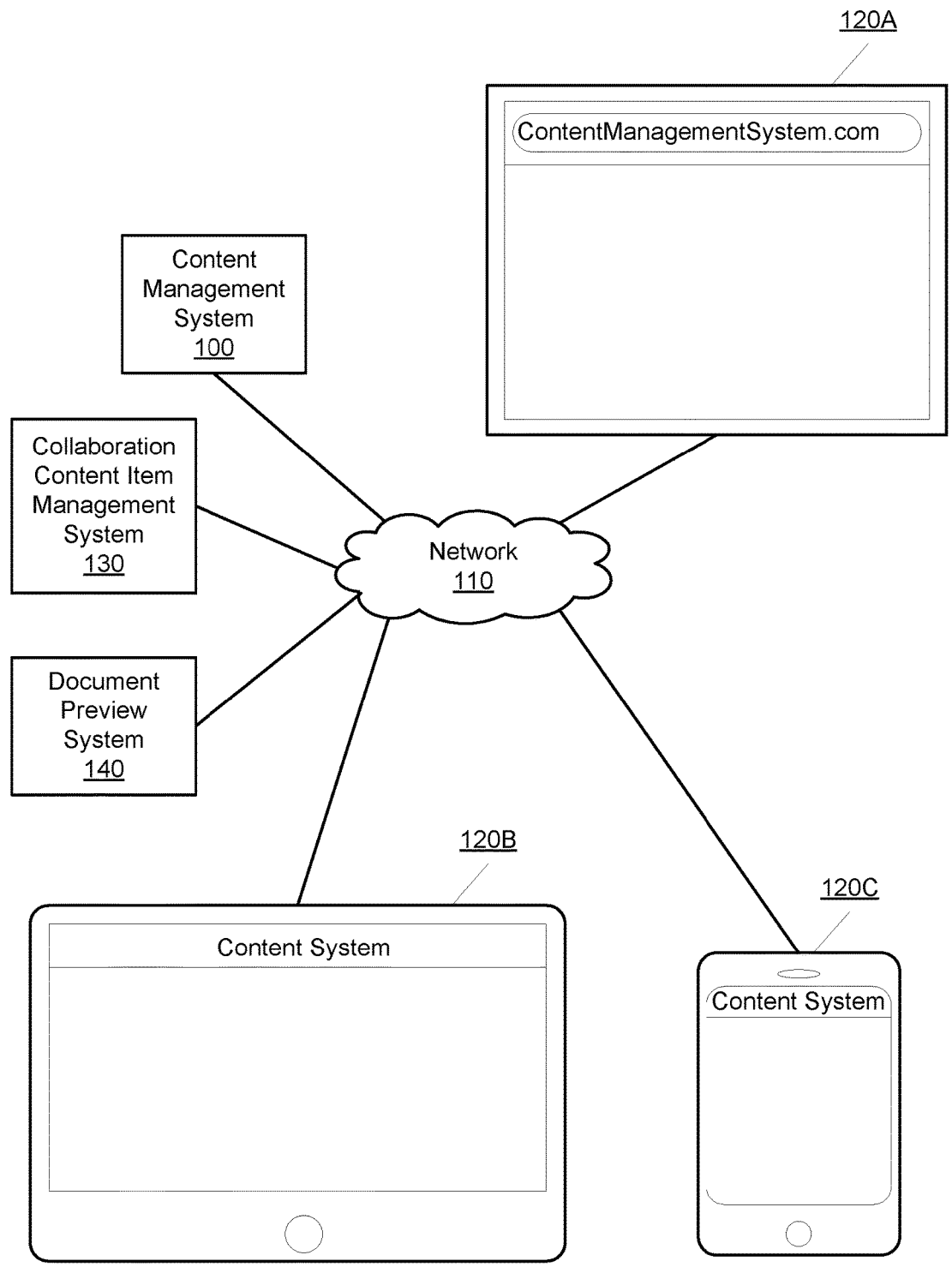
FIG. 1 shows a block diagram of a system environment, according to one embodiment.

FIG. 1 shows a system environment including content management system 100, collaboration content management system 130, and client devices 120A, 120B, 120C (collectively or individually "120"). Content management system 100 provides functionality for sharing content items with one or more client devices 120 and synchronizing content items between content management system 100 and the one or more client devices 120.

The content stored by content management system 100 can include any type of content items, such as documents, collaboration content items, text files, audio files, image files, video files, webpages, executable files, binary files, placeholder files that reference other content items, etc. In some implementations, a content item can be a portion of another content item, such as an image that is included in a collaboration content item. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, content stored by content management system 100 includes content items created using third party applications, e.g., word processors, video and image editors, database management systems, spreadsheet applications, code editors, and so forth, which are independent of content management system 100.

In some embodiments, content stored by content management system 100 includes content items, e.g., collaboration content items, created using a collaboration interface provided by collaboration content management system 130. In various implementations, collaboration content items can be stored by collaboration content management system 130, with content management system 100, or external to content management system 100. A collaboration interface can provide an interactive content item collaboration platform whereby users can simultaneously create and edit collaboration content items, comment in the collaboration content items, and manage tasks within the collaboration content items.

Users may create accounts at content management system 100 and store content thereon by sending such content from client device 120 to content management system 100. The content provided by users and associated with user accounts may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

In some embodiments, the content management system 100 and collaboration content management system 130 are combined into a single system. The system may include one or more servers configured to provide the functionality discussed herein for the systems 100 and 130.

Client Device

Figure 2:
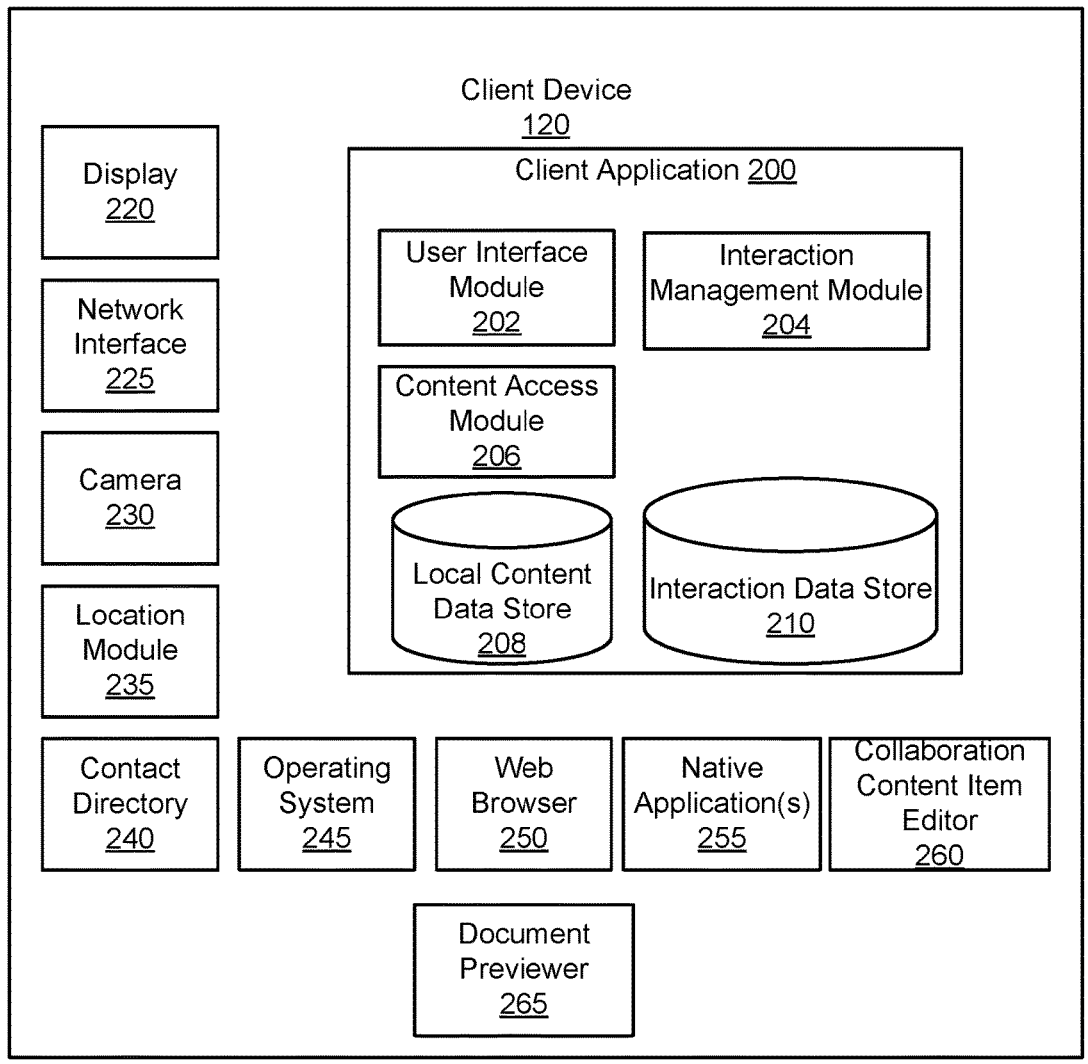
FIG. 2 shows a block diagram of the components of a client device, according to one embodiment.

FIG. 2 shows various modules and components of client device 120 in accordance with one embodiment. Client device 120 includes display 220 for providing information to the user, and in certain client devices 120 includes a touchscreen. Client device 120 also includes network interface 225 for communicating with content management system 100, and collaboration content management system 130 via network 110. Other conventional components of a client device 120 that are not material are not shown, for example one or more computer processors, local fixed memory (RAM and ROM), as well as optionally removable memory (e.g., SD-card), power sources, and audio-video outputs.

Client devices 120 maintain various types of components and modules for operating the client device and accessing content management system 100 and collaboration content management system 130. Software modules include operating system 245 and one or more native applications 255. Native applications 255 vary based on the client device, and may include various applications for creating, viewing, consuming, and modifying content stored on content management system 100, such as word processors, spreadsheets, database management systems, code editors, image and video editors, e-book readers, audio and video players, and the like. Software modules may include a collaboration content item editor 260. Collaboration content item editor 260 is configured for creating, viewing and modifying collaboration content items, and may be a standalone application or a web-based application. Operating system 245 on each device provides a local file management system and executes the various software modules such as client application 200 and native application 255. A contact directory 240 stores information about the user's contacts, such as name, picture, telephone numbers, company, email addresses, physical address, website URLs, and the like.

In certain embodiments, client device 120 includes additional components such as camera 230 and location module 235. Camera 230 may be used to capture images or video for upload to the online content management system 100 or collaboration content management system 130. Location module 235 determines the location of client device 120, using for example a global positioning satellite signal, cellular tower triangulation, or other methods. Location module 235 may be used by client application 200 to obtain location data and add the location data to metadata about a content item or collaboration content item, such as an image captured by camera 230.

Client devices 120 access content management system 100 and collaboration content management system 130 in a variety of ways. Client application 200 can be a dedicated application or module that provides access to the services of content management system 100 and collaboration content management system 130. Thus, the client application provides user access to shared content items and user collaboration content items through a user interface, as well as programmatic access for other applications. Client application 200 includes user interface module 202 that generates an interface to the content accessed by client application 200 and is one means for performing this function. Client device 120 may also access content management system 100 and collaboration content management system 130 through web browser 250. Alternatively or additionally, client application 200 may integrate access to content management system 100 with the local file management system provided by operating system 245. When access to content management system 100 is integrated in the local file management system, a file organization scheme maintained at content management system 100 is represented as a local file structure by operating system 245 in conjunction with client application 200. Client application 200 may store content accessed from a content storage at content management system 100 in local content data store 208. While represented here as within client application 200, local content 208 may be stored with other data for client device 120 in non-volatile storage. When local content 208 is stored this way, the content is available to the user and other applications or modules when client application 200 is not in communication with content management system 100 or collaboration content management system 130. Content access module 206 manages updates to local content 208 and communicates with content management system 100 to synchronize content modified by client device 120 with content maintained on content management system 100, and is one means for performing this function. Client application 200 may take various forms, such as a stand-alone application, an application plug-in, or a browser extension.

Interaction management module 204 of client application 200 identifies interactions that take place with respect to a content item, such as when a user opens, closes or edits the content item on the device, when a user previews a content item, or when a user is currently editing or collaborating in a collaboration content item. These interactions are identified by interaction management module 204 to generate interaction information describing the interaction with the content item. Interaction information includes interactions with client application 200, interactions with native application 255, and interactions with content items using client application 200 and native application 255. Interaction information may be stored in interaction data store 210 of client device 120. Interaction information determined from actions of native application 255 is termed presence information. An application, such as client application 200 that determines interaction information and presence information is termed a presence application. Additional types of interaction information (in addition to presence information) include comments, notes, messages, and notification requests related to the content item, which may be received by client application 200. Messages may include chat messages to other devices, and messages indicating a user's intent to interact with (e.g., to edit) a content item. Notification requests may include a request to be notified when another user's interaction information changes. Interaction information also includes metadata modifications, such as versioning notes, or requests for further information stored at content management system 100 about the content item, such as a request to view versioning information or prior content item versions. Interaction information may also include data associating comments with comment rooms or anonymous comments. For example, interaction information may include a room identifier indicating a comment room in which a particular interaction was performed, or an anonymous user identifier indicating an anonymous user account that provided an anonymous interaction.

Interaction management module 204 sends interaction information to other devices 120 that are synchronized with respect to the content item. The indication of intent may for example alert a second user of the content item on another device that the first user would like to edit the content item. Client application 200 identifies when users are using a native application 255 to interact with a content item, and also receives chat or intent information from a user. In various embodiments, device 120 identifies a user's presence in a content item (i.e., that the user has the content item open or is editing the content item).

Content Management System

Figure 3:
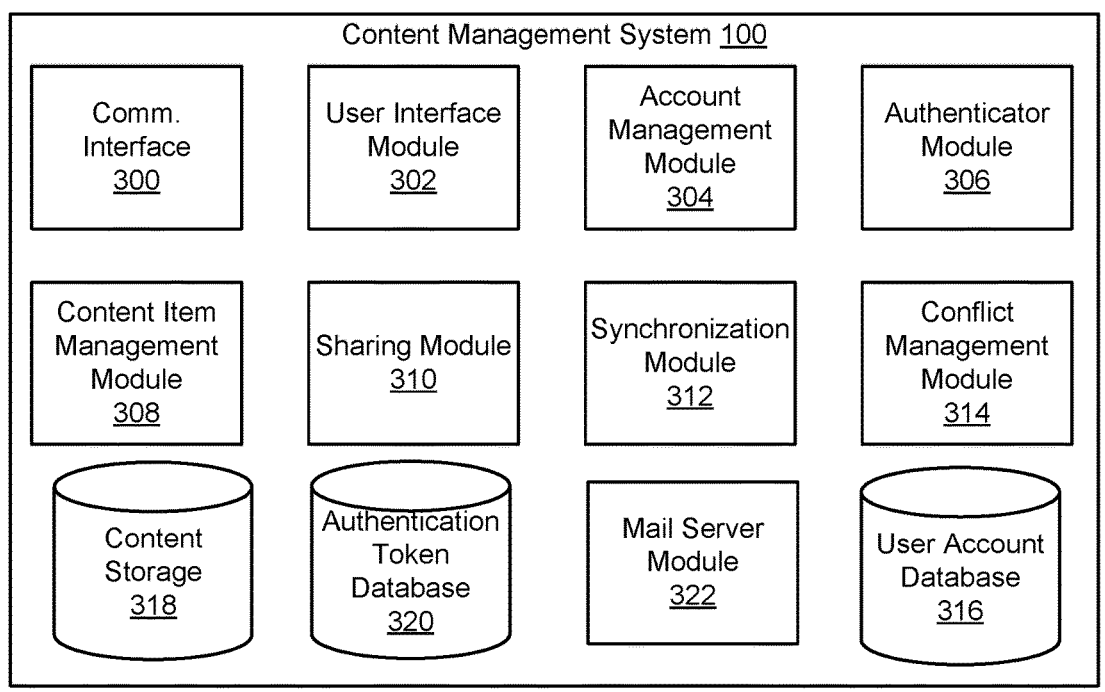
FIG. 3 shows a block diagram of a content management system, according to one embodiment.

FIG. 3 shows a block diagram of the content management system 100, according to one embodiment. To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a user identifier (or "userID") and a user name. For purposes of convenience, references herein to information such as collaboration content items or other data being "associated" with a user are understood to mean an association between a collaboration content item and either of the above forms of user identifier for the user. Similarly, data processing operations on collaboration content items and users are understood to be operations performed on corresponding identifiers, such as document identifiers (or "documentID") of the collaboration content items and userIDs. For example, a user may be associated with a collaboration content item by storing the information linking the userID and the documentID in a table, file, or other storage formats. For example, a database table organized by documentIDs can include a column listing the userID of each user associated with the collaboration content item. As another example, for each userID, a file can list a set of documentIDs associated with the user. As another example, a single file can list key values pairs such as <userID, documentID>representing the association between an individual user and a collaboration content item. The same types of mechanisms can be used to associate users with comments, threads, text elements, formatting attributes, and the like. In some embodiments, user identifiers are associated with room identifiers of comment rooms. In some embodiments, user identifiers are associated with anonymous user identifiers of anonymous users.

User account database 316 can also include account management information, such as account type, e.g., free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version. The change history may also include user identifiers or anonymous user identifiers to attribute changes to users.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Collaboration Content Management System

Figure 4:
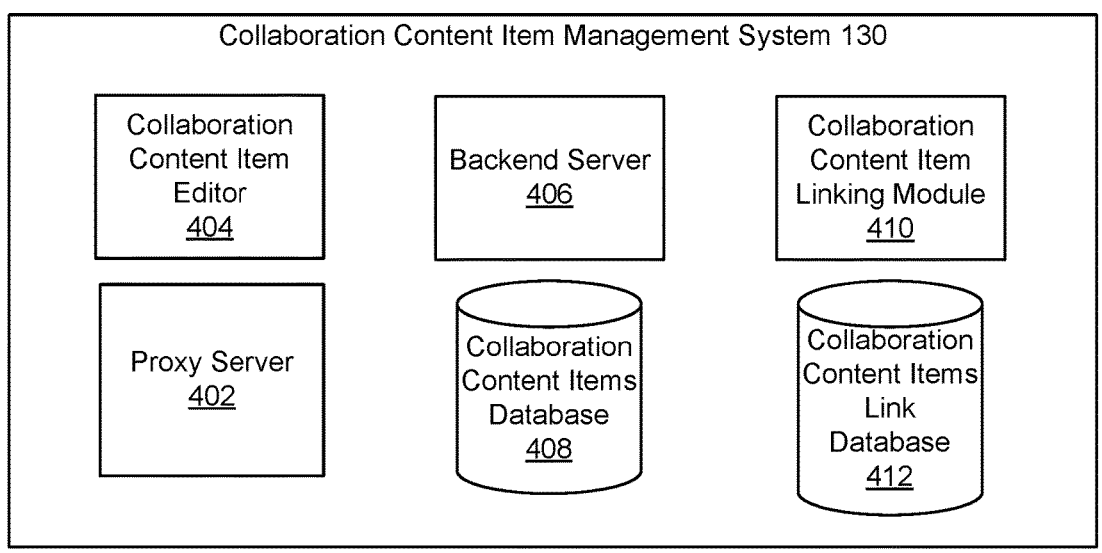
FIG. 4 shows a block diagram of a collaboration content management system, according to one embodiment.

FIG. 4 shows a block diagram of collaboration content management system 130, according to one embodiment. Collaboration content items can be files that users can create and edit using a collaboration content items editor 260 and can contain collaboration content item elements. Collaboration content item elements may include any type of content such as text; images, animations, videos, audio, or other multi-media; tables; lists; references to external content; programming code; tasks; tags or labels; comments; or any other type of content. Collaboration content item elements can be associated with an author identifier, attributes, interaction information, comments, sharing users, etc. Collaboration content item elements can be stored as database entities, which allows for searching and retrieving the collaboration content items. As with other types of content items, collaboration content items may be shared and synchronized with multiple users and client devices 120, using sharing module 310 and synchronization module 312 of content management system 100. Users operate client devices 120 to create and edit collaboration content items, and to share collaboration content items with other users of client devices 120.

In the embodiment shown in FIG. 1, collaboration content management system 130 is shown as separate from content management system 100, and can communicate with it to obtain its services. In other embodiments, collaboration content management system 130 is a subsystem of the component of content management system 100 that provides sharing and collaboration services for various types of content items. User account database 316 and authentication token database 320 from content management system 100 are used for accessing collaboration content management system 130 described herein.

Collaboration content management system 130 can include various servers for managing access and edits to collaboration content items. Collaboration content management system 130 can include proxy server 402, collaboration content item editor 404, and backend server 406. Proxy server 402 is responsible for handling requests from client applications 200 and passing those requests to the collaboration content item editor 404. Collaboration content item editor 404 manages application level requests for client applications 200 for editing and creating collaboration content items, and selectively interacting with backend servers 406 for processing lower level processing tasks on collaboration content items, and interfacing with collaboration content items database 408 as needed, and is one means for performing these functions. The collaboration content item editor 404 generates a collaboration interface for editing and creating collaboration content items, and associated comments. The comments may include standard comments, anonymous comments, and/or comments associated with comment rooms.

Collaboration content item database 408 stores collaboration content items, comments, and threads as database entities, and provides programmatic access thereto for searching and retrieving these entities and is one means for performing these functions.

Client application 200 sends a request relating to a collaboration content item to proxy server 402. Generally, a request indicates the user identifier of the user, and the collaboration content item identifier of the collaboration content item, and additional contextual information as appropriate, such as the text of the collaboration content item. When proxy server 402 receives the request, the proxy server 402 passes the request to the collaboration content item editor 404. Proxy server 402 also returns a reference to the collaboration content item editor 404 to client application 200, so the client application can directly communicate with the collaboration content item editor 404 for future requests. In an alternative embodiment, client application 200 initially communicates directly with a specific collaboration content item assigned to the user identifier.

When a collaboration content item editor 404 receives a request, it determines whether the request can be executed directly or by a backend server 406. When the request adds, edits, or otherwise modifies a collaboration content item the request is handled by the collaboration content item editor 404. If the request is directed to a database or index inquiry, the request is executed by a backend server 406. For example, a request from client device 120 to view a collaboration content item or obtain a list of collaboration content items responsive to a search term does not modify collaboration content items and is processed by backend server 406.

Collaboration content management system 130 includes collaboration content item linking module 410 for linking collaboration content items with content items of content management system 100. In various embodiments, collaboration content item linking module 410 communicates with content management system 100 and other modules of collaboration content management system 130 to facilitate linking new content items with existing collaboration content items, linking new collaboration content items with existing content items, and updating linked content items and collaboration content items.

Collaboration content item linking module 410 renders collaboration content item elements for sending to content management system 100. In one embodiment, rendering collaboration content item elements includes converting the collaboration content item to a specified syntax that incorporates collaboration content item text, formatting attributes, comments, and other collaboration content item elements to form a representation of the contents of the collaboration content item. In one embodiment, the syntax is a human-readable format, such as Markdown. In various other embodiments, rendering collaboration content item elements includes converting the collaboration content item to a format that is compatible with applications whose files are stored at content management system 100, such as native applications 255.

Collaboration content item linking module 410 converts content items received from content management system 100 to collaboration content item elements. In various embodiments, converting content items includes extracting text, formatting attributes, and other elements from content items for storage as collaboration content item elements in collaboration content item database 408.

Collaboration content item linking module 410 receives requests from users or other modules of collaboration content management system 130 to create new content items for linking with existing collaboration content items. Collaboration content item linking module 410 sends requests to content management system 100 to create content items with rendered collaboration content item contents, and receives content item identifiers identifying new linked content items in response. Collaboration content item linking module 410 stores content item identifiers for linked content items and collaboration content item identifiers for associated linked collaboration content items as link records in collaboration content item link database 412.

Collaboration content item linking module 410 receives requests from content management system 100 to create new collaboration content items for linking with existing content items at content management system 100. Collaboration content item linking module 410 receives content items, either as part of the request or separately, and converts the content items to collaboration content item elements. Collaboration content item linking module 410 stores the collaboration content item elements at collaboration content item database 408.

Collaboration content item linking module 410 sends updated collaboration content item contents to content management system 100 to facilitate updates to linked content items. As discussed above with respect to FIG. 3, linked content items are updated at content management system 100 responsive to changes to associated linked collaboration content items at collaboration content management system 130. Collaboration content item linking module 410 detects changes to linked collaboration content items and, in response, renders the collaboration content item elements to create collaboration content item content for sending to content management system 100. Collaboration content item linking module 410 sends collaboration content item contents for updated linked collaboration content items to content management system 100 so that the associated linked content items may be updated.

Collaboration content item linking module 410 receives updated content items from content management system 100 to facilitate updates to linked collaboration content items. As discussed above with respect to FIG. 3, linked collaboration content items are updated at collaboration content management system 130 responsive to changes to associated linked content items at content management system 100. In one embodiment, collaboration content item linking module 410 receives notifications from content management system 100 when content items are updated. Collaboration content item linking module 410 determines, from collaboration content item link database 412 whether the content items are linked with collaboration content items in collaboration content item database 408. For linked content items, collaboration content item linking module 410 requests the content items from content management system 100. Collaboration content item linking module 410 converts received content items to collaboration content item elements and stores the collaboration content item elements in collaboration content item database 408. In various embodiments, collaboration content item linking module 410 determines which elements or parts of elements of a collaboration content item have changed and only updates changed elements or parts of elements.

Anonymous Comment User Interface

Figure 5:
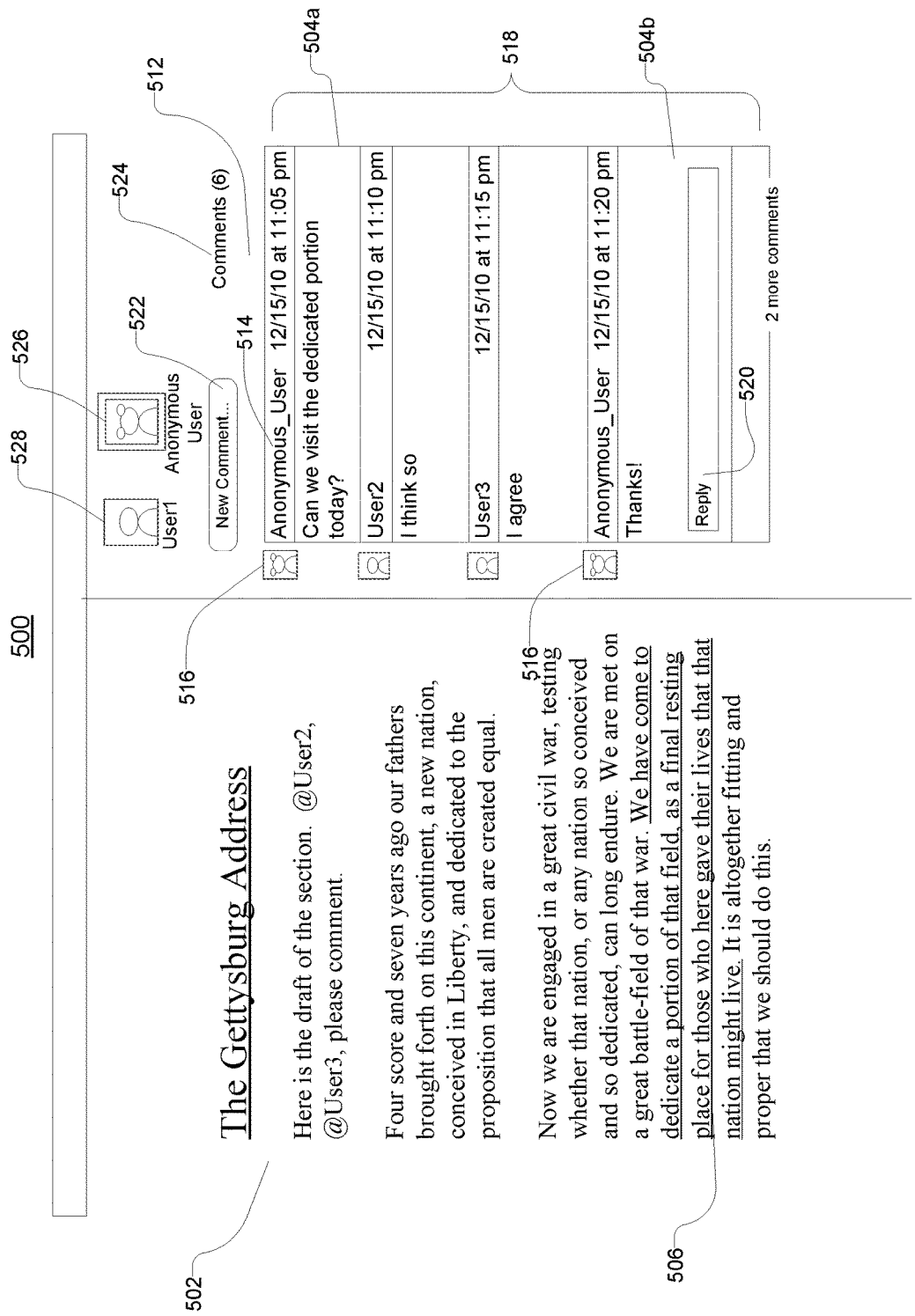
FIG. 5 shows an example of a user interface for anonymous comments, according to one embodiment.

FIG. 5 shows an example of a user interface 500 for providing anonymous comments, according to one embodiment. In some implementations, the user interface 500 may be a collaboration interface for the collaboration content item 502 generated by the collaboration content items editor 404 of the collaboration content management system 130.

A user may access the user interface 500 through a user account (e.g., "User1") by providing user credentials, security tokens, etc. The user interface 500 includes a collaboration content item 502 entitled, in this example, "The Gettysburg Address" in which several comments 504 have been made. Generally, a collaboration content item 502 can be composed of content such as lines of text, images, links, tables, lists, etc.

A collaboration content item can have zero or more comments 504, such as comments 504a and 504b. A comment can be associated with a specific section of content in a collaboration content item (also called a span) or with a collaboration content item as a whole. For example, when a user enters a comment the user may identify a section of content the comment should be associated with. The presence of comments with in a collaboration content item, such as comments 504, may be indicated by underlined, colored, highlighted, or otherwise distiguished portions 506 of text, though any other formatting may be used to indicate the presence of a comment 504 (e.g., lines connecting the comments to the text, comment numbers in superscript form, etc.).

The comments 504 can be arranged in a comment pane 512 positioned to the side of the body of the collaboration content item 502. Each comment 504 can have an author 514 and a creation date and time. A comment may also include a representation of the author, such as a user name and/or avatar 516. Multiple users, such as User1, User2, and User3, can submit anonymous or non-anonymous comments for display in the comment pane 512.

In some embodiments, a set of one or more related comments can be organized into a thread. For example, comments associated with a same span that together form an exchange between users can be grouped as a thread of comments. Threads can be displayed proximate to the span that is associated with the thread. In the example of FIG. 5, thread 518 includes six comments (four shown, and "2 more comments" as indicated). The collaboration content item 502 may include other threads, where each thread is associated with a span and one or more comments.

A user may create a new comment or reply to an existing comment. In some implementations, to create a comment, a user can select a span in the collaboration content item and activate a comment function, for example via button 522, a menu, or other input. The new comment 504 is displayed in the comment pane 512. When the comment is a standard comment, the displayed comment can indicate a user identifier, such as the user's name, and the creation time of the comment. The user may enter text or other content for the comment. The user can apply formatting to the content of the comment, similar to formatting the content of the collaboration content item. A user may also create a comment to include in a thread by entering text into a reply field 520 in one of the comments 504, such as the most recent comment in thread 518.

Interface 500 allows the user to post anonymous comments as an anonymous user. For example, the interface 500 includes an anonymous user button 526 that can be toggled on or off to enable or disable anonymous comment. The anonymous user button 526 may include an representation of an anonymous user 526, such as an avatar for the anonymous user. In some implementations, a collaboration content item may be specified to be comment anonymous. In such implementations, instead of users having an option to toggle between anonymous and standard comments, all comments are anonymous.

The interface 500 may also include user account indication 528, which includes a representation of the actual user account, such as username (e.g., "User1") and/or user avatar. The user avatar may be a profile picture of the user that facilitates identification of the actual user, or some other avatar that is associated with the user account. In some implementations, the user account indication 528 or other interface element provides a button for account settings, user login and logoff, etc.

When a user creates an anonymous comment 504a, an anonymous user identifier is used to attribute the anonymous comment 504a to an anonymous user. In various implementations, the anonymous user identifier can be unique to the user and/or the collaboration content item. The anonymous user identifier is different from the user identifier of the user and the document identifier of the collaboration content item. For example, the anonymous user identifier may be based on a hash that is generated using on an algorithmic transformation of the user identifier and the document identifier. Distinct user identifier and document identifier combinations are likely to result in different hash values. In another example, the hash may be used to reference a database with stored associations between hash values and anonymous user identifiers.

Anonymous comment 504a is displayed in comment pane 512. The representation of the anonymous user, such as avatar 516 and/or an anonymous user name, is presented with the comment to attribute the comment to the anonymous user. The presentation of anonymous comment 504a excludes any representation of the actual user, such as user account indication 528. The user may post attributed (non-anonymous) comments by unselecting the anonymous user button 526, which results in comments being attributed to the actual user.

The user can continue to post anonymous comments within the collaboration content item, or can post non-anonymous comments. In some implementations, the same anonymous user identifier for the user is persisted for multiple (e.g., all) anonymous comments by the user or all anonymous comments within a single collaboration content item. For example, when the anonymous user posts comment 504b, the user identifier of the actual user and the document identifier of the collaboration content item may be hashed to reconstruct the anonymous user identifier. The anonymous user avatar 516 may be determined based on the anonymous user identifier. Alternatively, a user identifier can be mapped to an anonymous user identifier, anonymous avatar, etc., such that the same user identifier or avatar can be used each time the corresponding user makes an anonymous comment. The representation of the anonymous user, such as the user name and avatar 516 presented with the anonymous comment 504a, is also presented with the anonymous comment 504b.

In some embodiments, when a user opens a collaboration content item initially, the comment pane 512 may be closed and the comments therein may be hidden. The user can activate the comment pane 512 to show the comments by selecting content (e.g., double clicking) that is formatted or otherwise indicated as having an associated comment. The comment pane 512 includes a counter 524 of the current number of comments in the collaboration content item that are visible to the user. Each comment can have a state, as to whether the comment is active or resolved. The counter 524 serves as a menu that the user can select from to filter the comments so as to show all comments, active comments or resolved comments.

Comment Room User Interface

Figure 6:
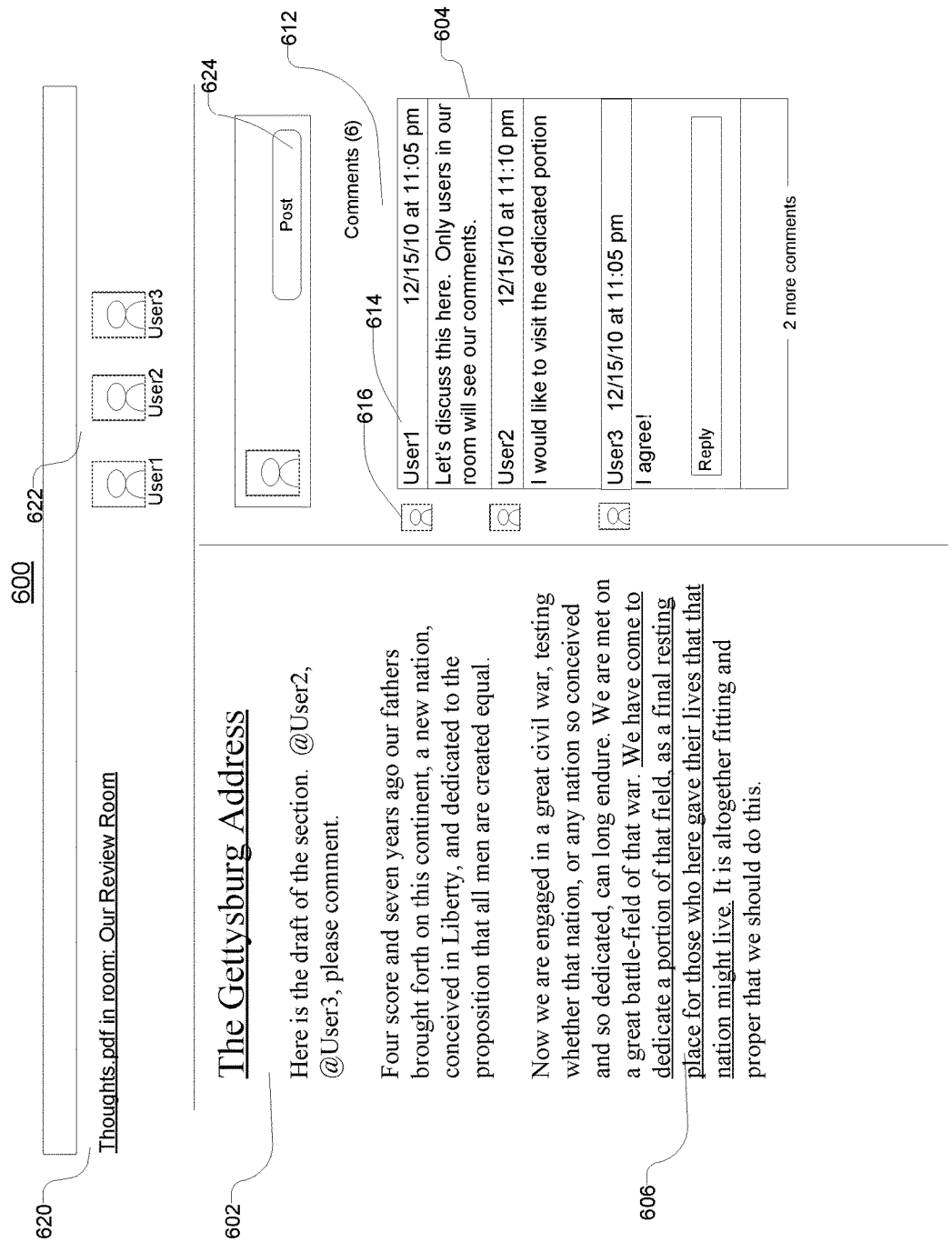
FIG. 6 shows an example of a user interface for a comment room, according to one embodiment.

FIG. 6 shows an example of a user interface 600 for providing a comment room, according to one embodiment. In some implementations, the user interface 600 may be a collaboration interface for the collaboration content item 602 generated by the collaboration content items editor 404 of the collaboration content management system 130.

A user may access the user interface 600 through a user account ("User1") by providing user credentials, security tokens, etc. A user may access a comment room in various ways. In some implementations, a list of comment rooms that the user has been invited to, or otherwise has access to, is presented to a user interface on the client device 120. When a user is invited to a comment room, the user identifier of the user may be added to a membership list (e.g., the Audience_list of a comment room 704, as discussed in greater detail below in connection with FIG. 7. In some implementations, a user receives a message from a comment room owner or member that invites the user to the comment room. The message can include a link to enter the comment, which may or may not require user authentication.

The user interface 600 includes the collaboration content item 602 entitled "The Gettysburg Address," in which several comments 604 have been made. As discussed above, the presence of comments 604 may be indicated by underlined or other differentiated portions 606 of content, though any other formatting may be used to indicate the presence of a comment. Comments 604 are arranged in a comment pane 612 positioned to the side of the body of the collaboration content item 602.

Interface 600 includes a comment room indicator 620, which indicates the name of the collaboration content item ("Thoughts.pdf") and the name of the comment room ("Our Review Room"). Each comment 604 has an author 614 and a creation date and time. A comment may also include a representation of the author, such as a user name and/or avatar 616. Multiple users, such as User1, User2, and User3, can be added to the comment room and submit comments for display in comment pane 612.

Comment room user indicator 620 includes an indication 622 of each user that has been invited to the comment room, are currently viewing the collaboration content item 602 within the comment room, or has previously accessed the comment room. One or more users may be added to the comment room for the collaboration content item 602. The indication 622 may include user names and/or user avatars. A comment posted by a user within the comment room is viewable by other users associated with the comment room. Comments that are associated with the collaboration content item 602 but created in other comment rooms are not presented within the comment pane 612 of this comment room. In some embodiments, a comment room may include anonymous comments and anonymous users. For example, after a user joins a comment room, the user may be allowed to post anonymously or non-anonymously within the comment room. In some implementations, a particular comment room may be specified as operating in a global anonymous comment mode. In such implementations, instead of users having an option to toggle between anonymous and non-anonymous or standard comments, all comments entered through that comment room are anonymous. Each comment, anonymous or non-anonymous, may have a comment identifier that is associated with the room identifier of the comment room. In some implementations, comments associated with the collaboration content item that were not created in a comment room are presented within the comment pane 612 of this comment room. In other implementations, such comments are excluded from the comment pane 612 of the comment room.

Database Structures

Figure 7:
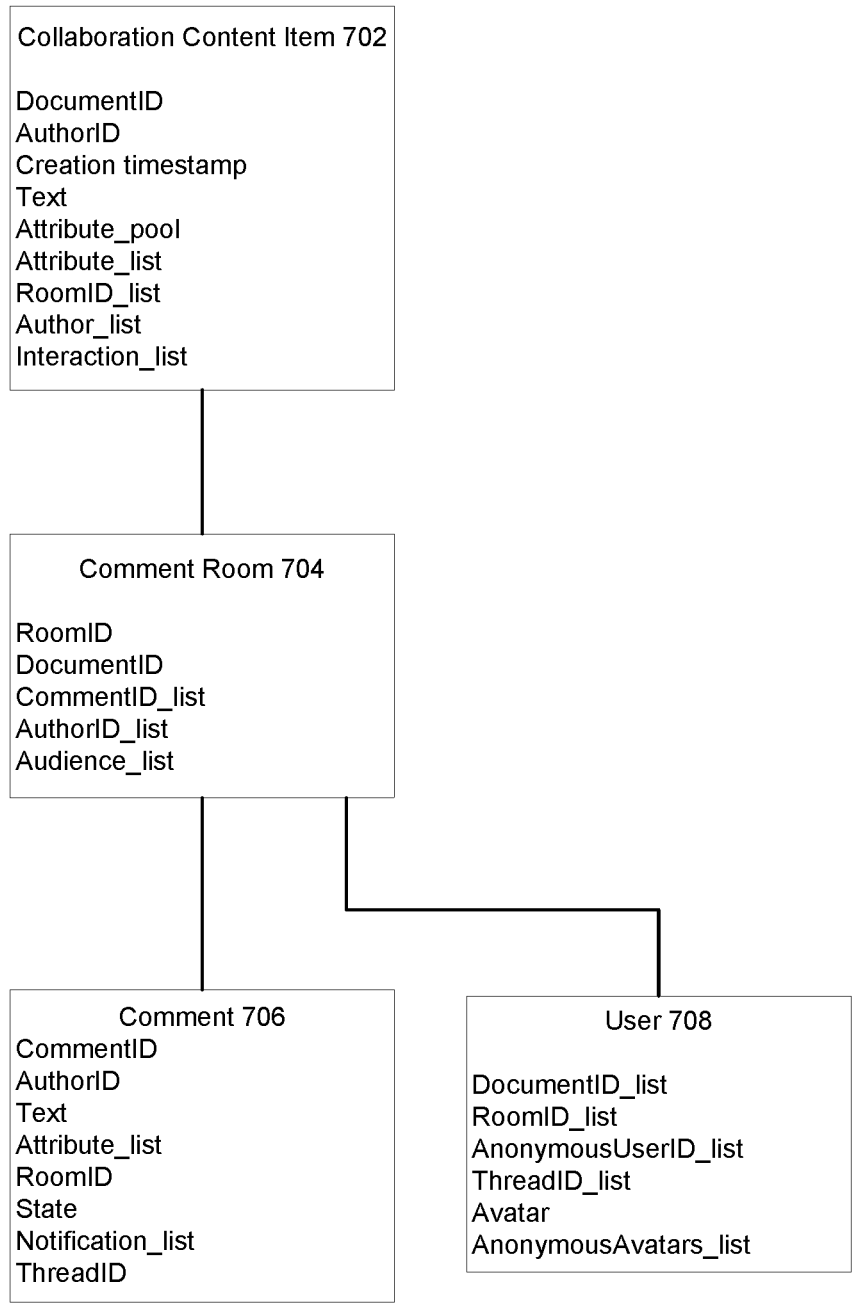
FIG. 7 shows an embodiment of the data structures for collaboration content items, comment rooms, comments, and users, according to one embodiment.

Referring to FIG. 7, collaboration content items database 408 can store the collaboration content items, comments, and comment rooms as database entities, and provides programmatic access thereto for searching and retrieving these entities and is one means for performing these functions. The databases 408 can be implemented in a relational form using separate tables for collaboration content items, comment rooms, and comments, or using objects, BLOBs, files, or other structures.

Each collaboration content item 702 is composed of a number of elements (equivalently fields, columns, or attributes). In one embodiment the elements are as follows:

DocumentID: a unique identifier assigned by the system to access the collaboration content item.

AuthorID: the user identifier of the user who created the collaboration content item, and may include the user name of the user. These values may be encrypted for privacy. The authorID may include an anonymous user identifier if an anonymous user created the collaboration content item.

Creation timestamp: indicates the date and time that the collaboration content item was created.

Text: The text of the collaboration content item is represented as string of ASCII characters. In some implementations, the collaboration content item 702 may include elements for non-text content such as images, links, tables, lists, etc. In some implementations, the text field can include a representation of or reference to such other content.

Attribute_pool: Formatting attributes (e.g., bold, underline, italics, font, font size, line spacing, paragraphs, and the like) that are used in the collaboration content item. The attribute pool is a set of attributeIDs used in the collaboration content item; a native set of attributeIDs and associated formats are provided by the system. The following table is an example of a portion of an attribute pool:

| Attribute ID | Formatting |
| --- | --- |
| 0 | None |
| 1 | Bold |
| 2 | Italic |
| 3 | Underline |
| 4 | Strikethrough |
| 5 | Superscript |
| 6 | Subscript |
| 7 | Single space |
| 8 | Double space |
| ... | ... |

Attribute_list: Formatting attributes are applied to portions of the collaboration content item by the attribute list. The Attribute_list element is a list of (text span=attributeID) pairs, where the attributeID indicates the attribute(s) from the attribute pool and the text span specifies the number of characters to which the attribute(s) is to be applied when the text is rendered, starting from the end of the previous text span, so that the entire length of the collaboration content item is coded for attributes. For example, the text "Text with bold, italic, and bold italic formatting." would be attribute coded as {10=0, 4=1, 2=0, 5=2, 6=0, 11=1 2, 12=0}.

RoomID_list: a list of all comment rooms associated with the collaboration content item. A collaboration content item may be associated with multiple comment rooms. The comment rooms may be separate from each other such that comments made in one room for a collaboration content item are not visible in another comment room for the collaboration content item. Thus, comment rooms enhance user privacy, which can encourage a greater participation level.

Author_list: a sequential list of the users who have contributed to the collaboration content item text, according to the sequence of contributed or edited text portions, using the same coding pattern as attribute list, i.e., (span=user identifier) pairs. For example, the author_list {100=199, 50=54, 200=199} indicates that in a text of 350 characters, there is a sequence of three text portion, the user with user identifier 199 authored the first portion with 100 characters, followed by user identifier 54 who authored the second portion with 50 characters, followed again by user identifier 199 who authored the third portion with the remaining 200 characters. The author list may include user identifiers, and in some embodiments, may include anonymous user identifiers. For example, if an anonymous user contributes collaboration content item text, the anonymous user identifier of the anonymous user may be stored in the author_list, such as in addition or alternative to the actual user identifier of the user being stored in the author_list.

The span coding of the attributes and authors is beneficial because it allows for efficient management of insertions and deletions of text. When text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example with the user identifier of each author followed by a list of text portions edited by that user.

Interaction_list: a list of interactions and associated user identifiers for the collaboration content item and other associated information such as timestamps for interactions. The interaction_list may include anonymous user identifiers if an anonymous user performed the interaction.

Each comment room 704 includes the following elements:

RoomID: unique room identifier for the comment room 704.

DocumentID: the identifier of the collaboration content item associated with the comment room 704.

CommentID_list: a list of commentIDs of the comments 806 included in the comment room 704.

AuthorID_list: a list of user identifiers of the authors of comments in the comment room. A user identifier may be an actual user identifier or an anonymous user identifier. For example, if a user provides a comment anonymously, the anonymous user identifier may be added to the authorID_list in alternative or in addition to the actual user identifier of the user.

Audience_list: a list indicating the users authorized to access the comment room. The audience_list thus indicates which users receive comment notifications associated with the comment room. In some embodiments, the audience_list may define a notification recipient list for changes in the comment room. Notified changes may include comments or updates to the underlying collaboration content item. In some embodiments, the audience comprises the user identifiers of i) the author of the collaboration content item within the comment room; ii) the authors of comments made in the comment room; iii) the authors of any text included in the collaboration content item; iv) any user mentioned in the collaboration content item (e.g., by inducing a special tag such as "@username"); v) any user mentioned in a comment; or vi) any user that has been invited or otherwise added to the comment room. The inclusion of an audience for each comment room allows for fine grain control of which users are notified of or have access to specific comments as further described below.

Each comment 706 includes the following elements:

CommentID: a unique comment identifier assigned to the comment.

AuthorID: the user identifier of the author of the comment. The authorID of an anonymous comment may include the anonymous user identifier of the author and/or the user identifier of the actual user.

Text: a string element storing the text of the comment. In some implementations, the comment 706 may include elements for non-text content such as images, links, tables, lists, etc.

Attribute_list: a list storing the formatting attributes for the content of the comment, in the same manner as described above for collaboration content item 702.

RoomID: the room identifier of the comment room to which the comment belongs.

State: an enumerated variable storing a value indicating the state of the comment as either active or resolved.

Notification_list: a list of user identifiers indicating the users to whom a notification related to the comment has been sent. This list is updated each time a notification message including or related to the comment is sent to specific user.

ThreadID: an identifier indicating a thread to which the comment belongs. A thread refers to a collection of comments associated with a span of content in the collaboration content item. Comments made within a comment room may also be organized into threads.

User information is also stored as database entities. Each user 708 includes the following elements:

DocumentID_List: a list of collaboration content item identifiers accessible by the user of the user identifier.

RoomID_List: a list of room identifiers of comment rooms accessible by the user of the user identifier. A user may have access to multiple comment rooms for a single collaboration content item.

AnonymousUserID_list: a list of anonymous user identifiers associated with the user. An anonymous user identifier for the user may be generated for each of the collaboration content items based on the user identifier of the user and the document identifier of the collaboration content item. In some embodiments, anonymous user identifiers are not stored by the system, but instead are reconstructed based on the stored user identifier and document identifier.

ThreadID_list: a list of threads in which the user has posted a comment, or is otherwise allowed to access.

Avatar: an identifier that references an avatar, such as an image, associated with the user 708. The avatar is used as a representation of the user. The avatar may be presented when the user provides a comment or updates a collaboration content item to attribute changes to the user.

AnonymousAvatars_list: a list of anonymous avatars associated with anonymous user identifiers of the user 708. Each anonymous user identifier may be associated with a different anonymous avatar identifier. In some embodiments, anonymous avatars are not stored in association with users, but instead are referenced by the anonymous user identifier.

Anonymous Comments

Figure 8A:
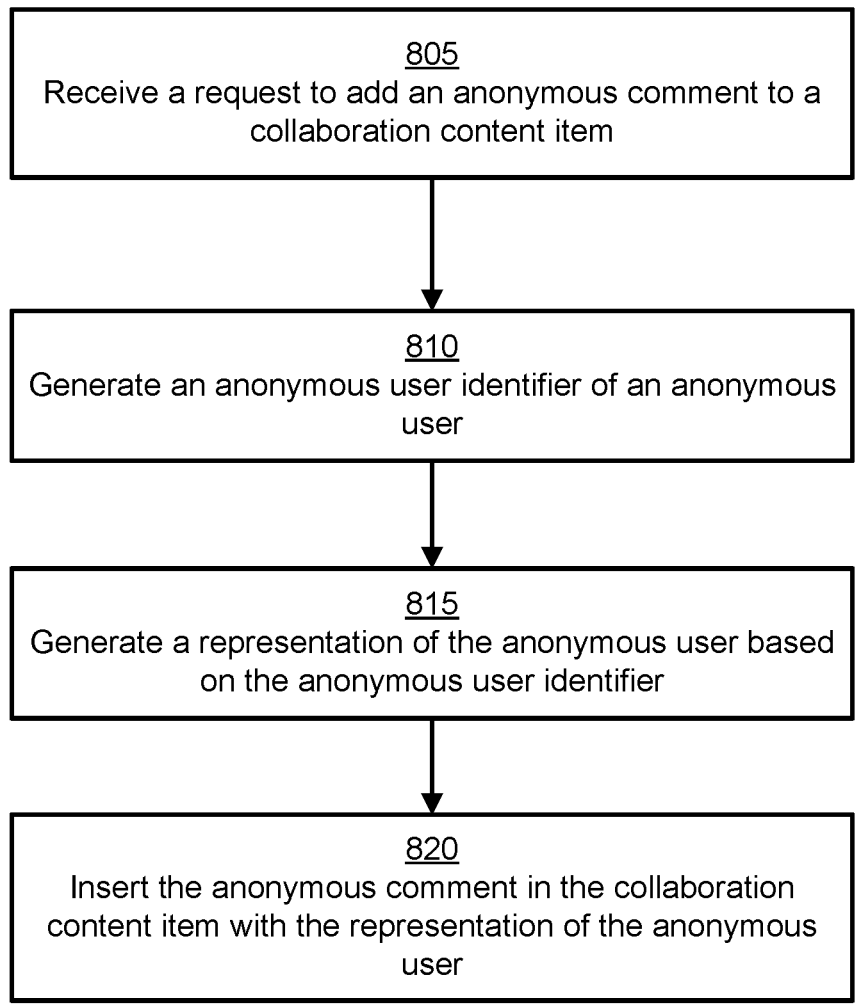
FIG. 8A shows a process for receiving and storing an anonymous comment, in accordance with one embodiment.

FIG. 8A shows a process 800 for receiving and storing an anonymous comment, in accordance with one embodiment. In process 800, a user is able to post an anonymous comment for a collaboration content item within a collaboration interface, which may be provided by the collaboration content management system 130.

The system 130 receives 805 a request to add an anonymous comment to a collaboration content item. Prior to generating the request, a user accesses the collaboration content item, either through a web browser 250, a collaboration content item editor 260, or the client application 200 of the client device 120, the system 130 receives the userID for the user, and the documentID for the collaboration content item from the client device 120. The system 130 passes the documentID and the userID to a collaboration content item database, such as database 408. The collaboration content item database looks up the documentID to access a path to retrieve the collaboration content item. In some embodiments, a check is performed to determine whether the userID has access to the collaboration content item.

The system 130 may allow the user to access a user interface for generating the request to add the anonymous comment to the collaboration content item, such as the user interface 500 shown in FIG. 5. In some implementations, an anonymous comment mode for the collaboration content item 502 is initiated through a selection of the anonymous user button 526. Subsequent to selection of the anonymous user button 526, the request to add the anonymous comment 504a to the collaboration content item 502 may be generated and sent to the system 130. In some implementations, all comments within the collaboration content item 502 may be designated as anonymous comments, such as by the creator, administrator, owner, or other authorized user of the collaboration content item 502. For example, the user interface 500 may include a button that allows authorized users to enforce a global anonymous comment mode. When the global anonymous comment mode is activated, a user can add an anonymous comment using a process similar to adding a standard comment, which is treated as the request to add the anonymous comment. The collaboration interface may further include a visual indication that the global anonymous comment mode is activated or deactivated for the collaboration content item.

Whether the user has selected the anonymous user button 526 or the collaboration content item 502 has been designated for anonymous comment, the user may generate the request to add the anonymous comment to the collaboration content item by selecting a portion of text from the collaboration content item 502, such as portion 506, and then selecting the comment button 522. The user enters the content of the comment, and posts the comment, resulting in the client device of the user sending, to the system 130, the request to add the anonymous comment 504a to the collaboration content item 502. In addition to the collaboration content item identifier and user identifier, the request may include data defining the comment such as an indication of the comment span, the comment content, an indication that the comment is anonymous, etc. In some implementations, anonymous or non-anonymous comment mode may alternatively or additionally be toggled for each individual comment.

The system 130 generates 810 an anonymous user identifier of an anonymous user. In some implementations, this can be done by combining the user identifier of the user and the document identifier of the collaboration content item such that the user identifier is not apparent from the anonymous user identifier. In some implementations, the anonymous user identifier can be generated in other ways such as by incrementing a count from a previous anonymous user identifier, selecting a random number, using a timestamp, etc. The anonymous user identifier identifies an anonymous user for anonymous comments posted within the collaboration content item by the user. In some embodiments, the anonymous user identifier may be generated based on a programmatic transformation of the user identifier of the user and the document identifier of the collaboration content item. As such, the user is associated with a different anonymous user identifier for each collaboration content item in which the user posts an anonymous comment.

In some embodiments, generating the anonymous user identifier by combining the user identifier and the document identifier includes generating a hash using the user identifier and the document identifier, e.g., as input to a hash function. The hash may be used as the anonymous user identifier. In some embodiments, the hash is used as a reference to a stored anonymous user identifier. For example, user account database 316 may store associations of anonymous user identifiers and hash values. The system 130 calculates the hash from the user identifier and document identifier, and requests the anonymous user identifier from the database 316 using the hash.

In some implementations, the anonymous user identifier is generated prior to step 805, such as when the user accesses the collaboration content item, when the user creates a user account, at predefined times (e.g., at periodic intervals), when the collaboration content item is created, when an anonymous comment mode for the collaboration content item is enabled, when the user is invited by another to access the collaboration content item, etc. If the anonymous user identifier has been previously generated for the user and collaboration content item, the anonymous user identifier is retrieved at 805 when the user generates the request to add the anonymous comment to the collaboration content item.

In some implementations, anonymous user identifiers are not associated with non-anonymous user accounts. For example, the system 130 may allow users to generate anonymous comments without registration and/or authentication of a user account. In some implementations, unregistered anonymous user accounts may include limited functionality. For example, the unregistered anonymous accounts may be allowed to post anonymous comments, but not allowed to modify the other contents of the collaboration content item (e.g., the text, images, links, tables, lists, etc.).

The system 130 generates 815 a representation of the anonymous user based on the anonymous user identifier. The representation of the anonymous user may include an anonymous avatar. The anonymous avatar is presented with the anonymous comment to attribute the anonymous comment to the anonymous user. The anonymous avatar refers to an avatar that does not reveal the identity of the user, unlike a profile picture for example. The anonymous avatar may be selected as a function of the anonymous user identifier such that each unique anonymous user identifier is associated with a unique anonymous avatar.

In some embodiments, the anonymous user identifier is used as a seed value for an avatar generator. The avatar generator outputs unique images based on an algorithmic transformation of different seed value inputs. In some embodiments, the system 130 sends the anonymous user identifier to a (e.g., third party) avatar service. The avatar service returns a unique avatar for the anonymous user identifier. As such, a user may be associated with multiple anonymous avatars for anonymous comments in different collaboration content items. In some embodiments, multiple anonymous comments on a single collaboration content item or across multiple collaboration content items, made by the same user, will be attributed to the same anonymous avatar and/or anonymous user identifier. In some implementations, multiple anonymous comments by the same user within a collaboration content item may be attributed to different anonymous user identifiers, anonymous user names, and/or anonymous avatars.

In some implementations, the system 130 allows the user to select an anonymous avatar from a set of available anonymous avatars. The selected anonymous avatar is mapped to the anonymous user identifier for the user for the collaboration content item, and retrieved to provide the representation of the anonymous user.

The system 130 inserts 820 the anonymous comment in the collaboration content item with the representation of the anonymous user. With reference to FIG. 5, anonymous comment 504a is inserted within the collaboration content item 502 with the anonymous avatar 516. The anonymous avatar 516 represents the anonymous user, and is persisted for other anonymous comments by the user within the collaboration content item, as shown by comment 504b. The anonymous comments 504a and 504b inserted in the collaboration content item exclude an representation of the user identifier or a user avatar that indicate the user identifier. For example, comment 504a and 504b exclude any indication that the comments were created by the User1 as identified by the user account indication 528.

In some implementations, the system 130 provides a user interface, which may be a collaboration interface or other user interface, to reveal the actual user behind an anonymous comment. An administrator or owner of the collaboration content item can use the interface to prevent unauthorized, improper, or abusive usage of anonymous comments.

Figure 8B:
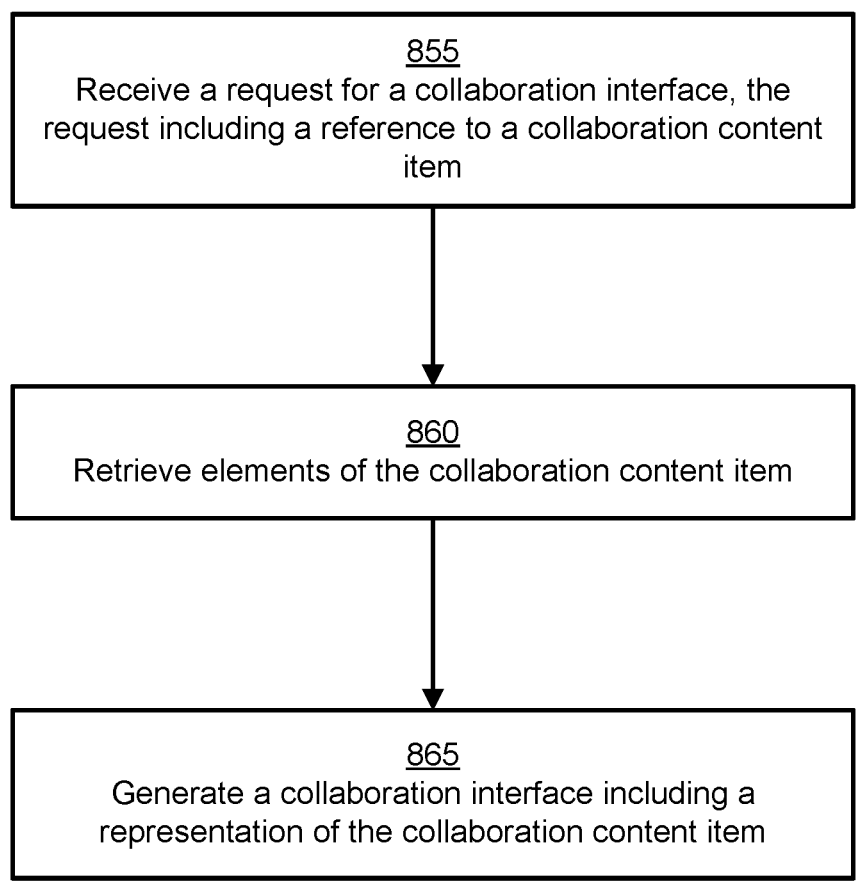
FIG. 8B shows a process for generating a collaboration content item representation including anonymous comments, in accordance with one embodiment.

FIG. 8B shows a process 850 for generating a collaboration content item representation including anonymous comments, in accordance with one embodiment. The system 130 receives 855 a request for a collaboration interface, the request including a reference to collaboration content item.

For example, the client device 120 sends the request to the system 130 to access the user interface 500 for the collaboration content item 502. The client device 120 generates the request through a web browser 250, a collaboration content item editor 260, or the client application 200 of the client device 120. The request may include the userID for the user, and the documentID for the collaboration content item.

The system 130 retrieves 860 the elements of the collaboration content item. In some implementations, two of the elements can be anonymous comments by the same user. The elements may include a first and second anonymous comment by the same user. For example, the collaboration content items database 408 stores the collaboration content items 702, comment rooms 704, and comments 706 as described above in connection with FIG. 7. The elements and sub-elements of the collaboration content item 702 may be retrieved based on the documentID of the collaboration content item 702. The anonymous comments include sub-elements as shown by the comments 706 element, such as the AuthorID. The AuthorID of the comment 706 defines the user identifier of the author of the comment. If an anonymous user has posted multiple anonymous comments within the collaboration content item (and if applicable, a particular comment room), then each anonymous comments may be identified as being by the same anonymous user based on the AuthorID of the anonymous comments.

The system 130 generates 865 the collaboration interface including a representation of the collaboration content item. The user interface 500 shown in FIG. 5 is an example of a collaboration interface including anonymous comments. Generating the collaboration interface may include providing a representation of the first anonymous comment with a representation of the anonymous user, and providing a representation of the second anonymous comment with the representation of the anonymous user. For example, the user interface 500 includes a representation of a first anonymous comment 504*a* with a representation of the user 516 (or "avatar 516"), and a second anonymous comment 504*b* with the same representation of the user 516. The comments may be arranged in a sequence as shown by the comment pane 512. In some implementations, the system 130 assembles the collaboration content item into a displayable representation (or provides the underlying data to the client application for rendering). The assembled collaboration content item is then provided to the client device, where is it displayed. The client device may be the client device of the user that created an anonymous comment, or another user that has access to the collaboration content item and the anonymous comment.

Comment Rooms

FIG. 9A shows a process 900 for creating a comment room, in accordance with one embodiment. A comment room allows users to post comments that are visible to users within the comment room, and not visible to users outside the comment room even if those users otherwise have access to the collaboration content item. Comment room access may be provided via a collaboration interface of the collaboration content management system 130.

The system 130 creates 905 a comment room for a collaboration content item by associating a document identifier of the collaboration content item with a room identifier of the comment room. A user accesses a user interface for the collaboration content item through a web browser 250, a collaboration content item editor 260, or the client application 200 of the client device 120. Using the user interface, the user may create a comment room for the collaboration content item, and add one or more users to the comment room. As discussed above in connection with FIG. 7, collaboration content item 702 may be associated with multiple comment rooms 704, with each comment room uniquely identified by a room identifier (RoomID).

The system 130 adds 910 users to the comment room by associating the user identifiers and the room identifier. With reference to FIG. 7, the Audience_list element of the comment room 704 may be updated with user identifiers of the users to add the users to the comment room. Alternatively or additionally, the RoomID_list element of the users 708 may be updated to include the room identifier of the comment room. In various implementations, additional users may be invited to the comment room by the creator of the comment room and/or a member of the comment room. In another example, users may register for inclusion within a comment room.

In some embodiments, comment room membership may be based on user group membership. For example, a comment room may be designated as public (open to all users), internal only (e.g., the creator's team or selected team), or private (e.g., user only, added users or user groups, etc.).

In some embodiments, users invited to the comment room can receive a shared link to access the comment room or can access a list of comment rooms they have been invited to when logged into the system. Comment room members may access a version of the collaboration content item specific to the comment room. In some embodiments, when inside a collaboration content item, the user interface provides a list of the comment rooms for the collaboration content item that are accessible to the user.

Figure 9B:
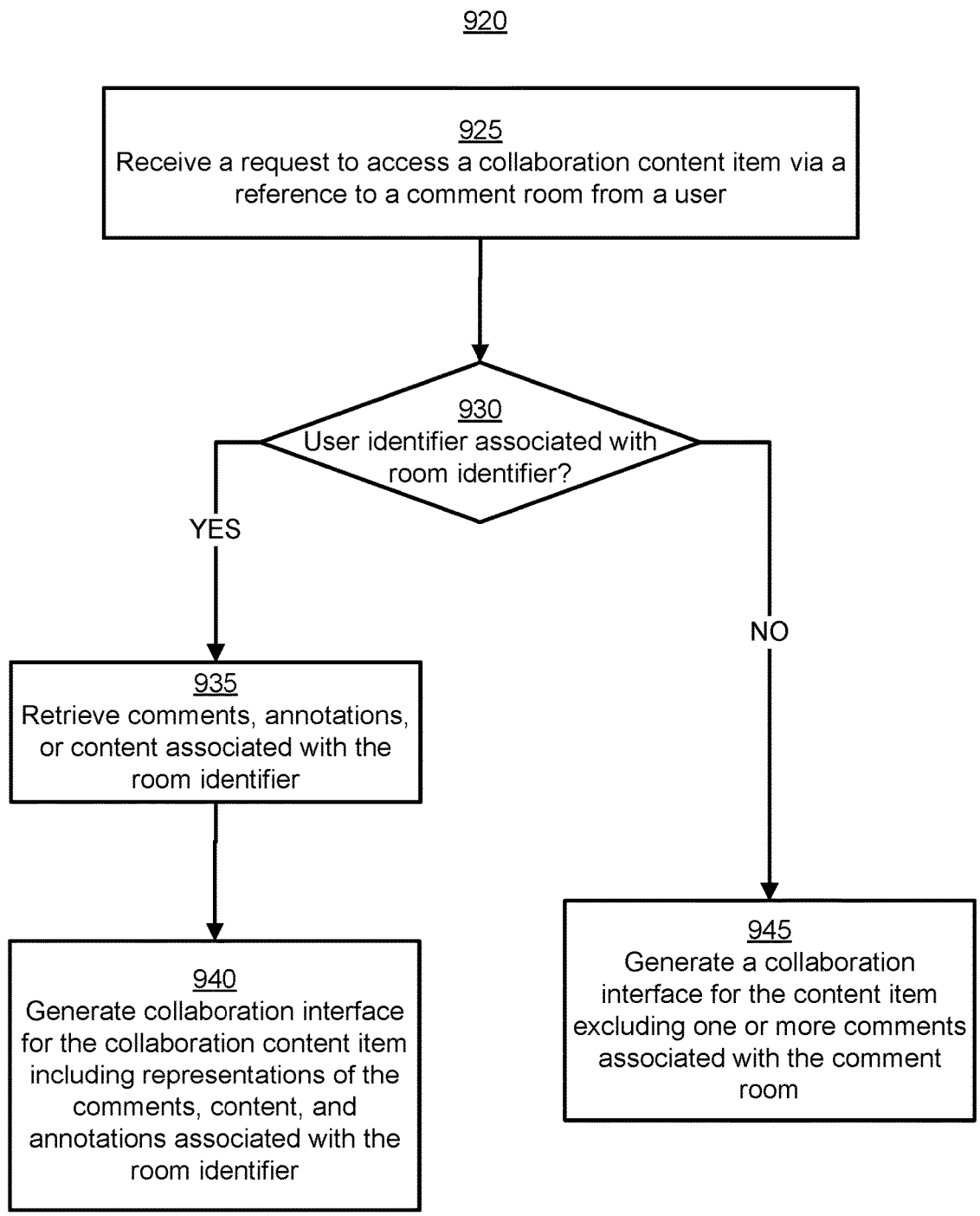
FIG. 9B shows a process for accessing a collaboration content item through a comment room, in accordance with one embodiment.

FIG. 9B shows a process 920 for accessing a collaboration content item through a comment room, in accordance with one embodiment. The system 130 receives 925 a request to access a collaboration content item via a reference to a comment room from a user. The request may be from the user that created the comment room, or a different user. For example, a user may request access to the comment room through a comment room invitation, or through a list of comment rooms that user has been invited to or otherwise has access to. In another example, a user may request access to the collaboration content item not in relation to a comment room. The system 130 receives the request from a client device 120 associated with the user. The request may include the collaboration content item identifier of the collaboration content item and the room identifier of the comment room, the room identifier providing the reference to the comment room.

The system 130 determines 930 whether a user identifier of the user requesting access to the comment room is associated with the room identifier of the comment room. For example, the system 130 may reference the Audience_list element of the comment room 704 of the collaboration content item 702 to determine whether the user identifier of the requesting user is associated with the room identifier. In another example, the system 130 references the RoomID_list element of the requesting user 708 to determine whether the room identifier of the comment room is associated with the user identifier. The association of the user with the comment room grants the user access to the comment room to view comments provided within the comment room, to add comments within the comment room, to update content of the collaboration content item within the comment room, etc. In some implementations, a user that accesses a comment room (e.g., through a link or list of comment rooms) can provide comments within the comment room, or access comments associated with the comment room, such as without any association of the user identifier of the user and the room identifier of the comment room.

In response to determining that the user identifier is associated with the room identifier of the comment room, the system 130 retrieves 935 comments, annotations, and/or content associated with the room identifier. For example, the system 130 retrieves the elements of the comment room 704. The elements may include the commentID_list element that includes the comment identifiers of comments associated with the comment room. In some implementations, each room identifier may be further associated with a unique version of the collaboration content item. Different versions of the collaboration content item associated with different comment rooms may include different content such as text, images, links, tables, lists, etc.

The system 130 generates 940 a collaboration interface for the collaboration content item including representations of the comments, content, and annotations associated with the room identifier. The user interface 600 shown in FIG. 6 is an example of a collaboration interface for a comment room. The discussion regarding providing a collaboration interface on the client device 120 at step 865 of process 850 may be applicable at 940. For example, the system 130 may generate and provide a representation of the collaboration content item associated with the comment room to the client device 120.

Returning to 930, in response to determining that the user identifier fails to be associated with the room identifier of the comment room, the system 130 generates 945 a collaboration interface for the collaboration content item excluding one or more comments, annotations, and/or content associated with the comment room. For example, the generated collaboration interface may include comments from a different comment room associated with the user and collaboration content item. In another example, the generated collaboration interface includes comments associated with the collaboration content item but not associated with a comment room. Alternatively, the system can provide a notification that the user does not have access to the indicated comment room.

In some embodiments, a user with sufficient permissions can merge comments from multiple comment rooms associated with a collaboration content item if the user is a member of each of the comment rooms. The system may provide an indication of the comment room for each comment of a collaboration content item. The system can also show various sets of comments room comments, such as by having a set of check boxes so user can select a set of comment rooms, of which they are a member, for merging comments associated with the set of comments rooms into a single view in the user interface. Once merged, a single collaboration interface may include representations of comments, contents, and annotations made in multiple comment rooms.

Figure 9C:
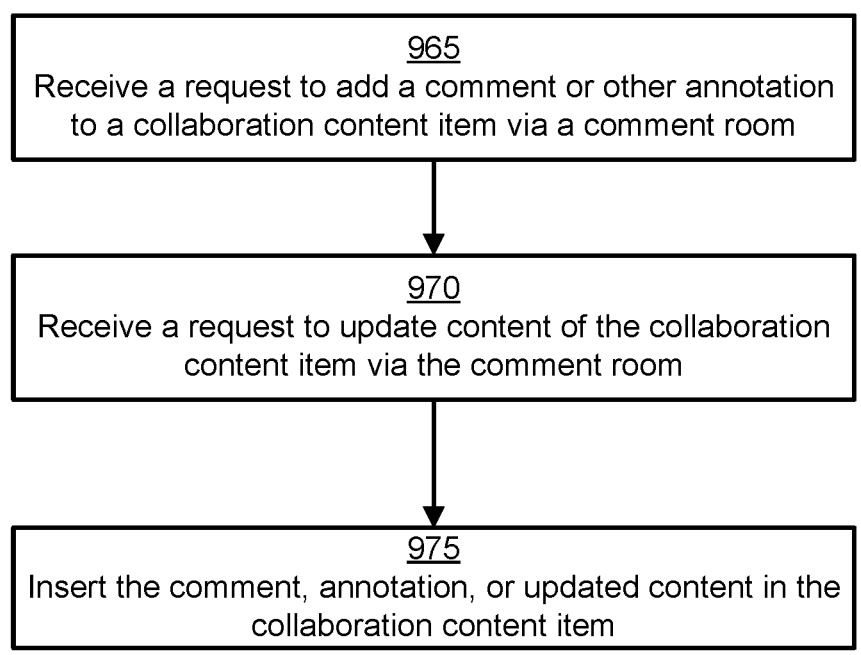
FIG. 9C shows a process for providing a comment, annotation, or content update within a comment room, in accordance with one embodiment.

FIG. 9C shows a process 960 for providing a comment, annotation, or content update within a comment room, in accordance with one embodiment. The system 130 receives 965 a request to add a comment or other annotation to a collaboration content item via the comment room. The collaboration content item is presented in a user interface for the comment room, such as the user interface 600 shown in FIG. 6. The user generates the request to add the comment 604 to the collaboration content item 602 by selecting a portion of content from the collaboration content item 602, such as portion 606, and then selects the comment button 624 to generate the comment. The user enters the content of the comment, and posts the comment, resulting in the client device of the user sending the request to add the comment 604 to the collaboration content item 602 to the system 130.

The request to add the comment may include elements defining the comment 706, as shown in FIG. 7 (e.g., text, threadID, etc.). The request may further include the room identifier to identify the comment room in which the comment or annotation was added to the collaboration content item. The system 130 stores the received elements as a comment 706 of the comment room 704. The system 130 may also update the commentID list of the comment room 704 to include the comment identifier of the comment.

The system 130 receives 970 a request to update content of the collaboration content item via the comment room. The user may generate the request to update the content using the collaboration interface. The content may be defined by database elements of the collaboration content item 702 that are associated with the RoomID of the comment room 704. Content that may be updated within a comment room may include text, images, links, tables lists, etc. The system 130 may store different versions of the collaboration content item for each comment room. As such, different versions of the collaboration content item may include different content, annotations, comments, etc.

The system 130 inserts 970 the comment, annotation, or updated content in the collaboration content item. Subsequent to insertion, the system 130 may generate a collaboration interface including the content item with the inserted comment, annotation, or updated content. An inserted comment may include a representation of the user, such as a user name or avatar. With reference to FIG. 6, comment 604 is inserted within the collaboration content item 602 with the avatar 616 of the User1 user. The avatar 616 is associated with the user identifier of the user account. In some embodiments, the avatar 616 is a profile picture of the user.

In some implementations, a comment room includes anonymous comments. A user, such as an owner, creator, or other authorized user of the comment room, may specify that the comment room is designated for anonymous comments, or allow users associated with the comment room to selectively toggle between anonymous or non-anonymous comments within the comment room. The anonymous comments for a collaboration content item posted within a comment room may include a representation of the anonymous user.

Reference in the specification to "one embodiment," "some embodiments," or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting 'at least one of' an element or another element refers to any possible permutation of the set of elements. For example, claim language reciting 'at least one of A and B' or 'at least one of A or B' means A, B, or both A and B."

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method, comprising:
receiving a first request to add a first anonymous comment to a collaboration content item shared among multiple users, the first anonymous comment authored by a first user associated with a first user identifier, the collaboration content item associated with a document identifier;
generating an anonymous user identifier for the first user by combining the first user identifier and the document identifier such that the first user identifier is not apparent from the anonymous user identifier;
selecting, based on the anonymous user identifier, an anonymous representation of the first user; and
inserting the first anonymous comment in the collaboration content item, wherein the first anonymous comment includes the anonymous representation of the first user.

2. The method of claim 1, wherein inserting the first anonymous comment in the collaboration content item is performed by including an indication of an association between a selected portion of the collaboration content item and the first anonymous comment.

3. The method of claim 1, wherein generating the anonymous user identifier includes generating a hash of the first user identifier and the document identifier.

4. The method of claim 1 further comprising:
receiving a second request to add a second anonymous comment to the collaboration content item, the second anonymous comment authored by the first user associated with the first user identifier;
re-generating the anonymous user identifier for the first user by combining the first user identifier and the document identifier;
re-selecting, based on the re-generated anonymous user identifier, the anonymous representation of the user; and inserting the second anonymous comment in the collaboration content item, wherein the second anonymous comment includes the re-selected anonymous representation of the user.

5. The method of claim 1, wherein selecting the anonymous representation of the user includes:
sending a request to an avatar service, the request including the anonymous user identifier; and
receiving, as the anonymous representation of the first user, an anonymous avatar in response to the request.

6. The method of claim 1, wherein the first anonymous comment inserted in the collaboration content item excludes a representation of the first user.

7. The method of claim 1, further comprising:
receiving a second request to add a standard comment to the collaboration content item, the second comment authored by the first user associated with the first user identifier; and
inserting the second comment in the collaboration content item, wherein the second comment includes a representation of the first user.

8. The method of claim 7, further comprising toggling between a standard comment mode and an anonymous comment mode based on a third request from the first user, wherein the first request is received in the anonymous comment mode and the second request is received in the standard comment mode.

9. The method of claim 1, further comprising:
receiving a second request to add a second anonymous comment to a second collaboration content item associated with a second document identifier, the second anonymous comment authored by the first user associated with the first user identifier;
generating a second anonymous user identifier for the first user based on the first user identifier and the second document identifier;
selecting, based on the second anonymous user identifier, a second anonymous representation of the user, the second anonymous representation of the user being different from the first representation of the user; and
inserting the second anonymous comment in the second collaboration content item, wherein the second anonymous comment includes the second anonymous representation of the user.

10. The method of claim 9, wherein:
the anonymous representation of the first user is a first anonymous avatar; and
the second anonymous representation of the first user is a second anonymous avatar different from the first anonymous avatar.

11. The method of claim 1, further comprising, prior to receiving the first request, receiving a second request to designate all comments for the collaboration content item as anonymous comments, and wherein the second request causes a request to add a standard comment to the collaboration content item to be converted into the first request to add the first anonymous comment to the collaboration content item.

12. A system, comprising:
one or more servers configured to:
receive a request to add a first anonymous comment to a collaboration content item, the first anonymous comment authored by a first user associated with a first user identifier, the collaboration content item associated with a document identifier;
generate an anonymous user identifier for the first user based on the first user identifier and the document identifier such that the first user identifier is not apparent from the anonymous user identifier;
select, based on the anonymous user identifier, an anonymous representation of the first user; and
generate a collaboration interface including a representation of the collaboration content item, the representation including the first anonymous comment, wherein the first anonymous comment includes the anonymous representation of the first user.

13. The system of claim 12, wherein the one or more servers configured to generate the anonymous user identifier includes the one or more servers being configured to generate a hash of the first user identifier and the document identifier.

14. The system of claim 12, wherein the one or more servers are further configured to:
receive a second request to add a second anonymous comment to the collaboration content item, the second anonymous comment authored by the first user associated with the first user identifier;
re-generate the anonymous user identifier for the first user by combining the first user identifier and the document identifier;
re-select, based on the re-generated anonymous user identifier, the anonymous representation of the user; and
insert the second anonymous comment in the collaboration content item, wherein the second anonymous comment includes the re-selected anonymous representation of the user.

15. The system of claim 12, wherein the one or more servers configured to select the anonymous representation of the user includes the one or more servers being configured to:
send a request to an avatar service, the request including the anonymous user identifier; and
receive, as the anonymous representation of the first user, an anonymous avatar in response to the request.

16. The system of claim 12, wherein the one or more servers are further configured to:
receive a second request to add a standard comment to the collaboration content item, the second comment authored by the first user associated with the first user identifier; and
insert the second comment in the collaboration content item, wherein the second comment includes a representation of the first user.

17. The system of claim 12, wherein the one or more servers are configured to toggle between a standard comment mode and an anonymous comment mode based on a third request from the first user, the first request is received in the anonymous comment mode and the second request is received in the standard comment mode.

18. The system of claim 12, wherein the one or more servers are further configured to:
receive a second request to add a second anonymous comment to a second collaboration content item associated with a second document identifier, the second anonymous comment authored by the first user associated with the first user identifier;
generate a second anonymous user identifier for the first user based on the first user identifier and the second document identifier;
select, based on the second anonymous user identifier, a second anonymous representation of the user, the second anonymous representation of the user being different from the first representation of the user; and insert the second anonymous comment in the second collaboration content item, wherein the second anonymous comment includes the second anonymous representation of the user.

19. The system of claim 12, wherein the one or more servers are further configured to, prior to receiving the first request, receive a second request to designate all comments for the collaboration content item as anonymous comments, and wherein the second request causes a request to add a standard comment to the collaboration content item to be converted into the first request to add the first anonymous comment to the collaboration content item.

20. A non-transitory computer-readable storage medium storing instructions that, when executed by a computing system, cause the computing system to perform operations comprising:
  receiving a first request to add a first anonymous comment to a collaboration content item shared among multiple users, the first anonymous comment authored by a first user associated with a first user identifier;
  generating an anonymous user identifier for the first user based on the first user identifier such that the first user identifier is not apparent from the anonymous user identifier;
  selecting, based on the anonymous user identifier, an anonymous representation of the first user; and
  inserting the first anonymous comment in the collaboration content item, wherein the first anonymous comment includes the anonymous representation of the first user.

* * * * *